(12) United States Patent
Legerton

(10) Patent No.: US 7,401,922 B2
(45) Date of Patent: Jul. 22, 2008

(54) METHOD AND APPARATUS FOR REDUCING OR ELIMINATING THE PROGRESSION OF MYOPIA

(75) Inventor: Jerome Legerton, San Diego, CA (US)

(73) Assignee: Synergeyes, Inc., San Marcos, CA (US)

(*) Notice: Subject to any disclaimer, the term of this patent is extended or adjusted under 35 U.S.C. 154(b) by 296 days.

(21) Appl. No.: 11/105,700

(22) Filed: Apr. 13, 2005

(65) Prior Publication Data

US 2006/0232743 A1   Oct. 19, 2006

(51) Int. Cl.
*A61B 3/00* (2006.01)
*A61B 3/10* (2006.01)

(52) U.S. Cl. .................. 351/246; 351/205; 351/211

(58) Field of Classification Search ......... 351/205–223, 351/246

See application file for complete search history.

(56) References Cited

U.S. PATENT DOCUMENTS

| | | | |
|---|---|---|---|
| 3,876,581 A | 4/1975 | Neogi | 521/62 |
| 4,121,885 A | 10/1978 | Erickson et al. | 606/5 |
| 4,869,587 A | 9/1989 | Breger | 351/161 |
| 5,114,628 A | 5/1992 | Hofer et al. | 264/1.37 |
| 5,422,687 A | 6/1995 | Tanaka et al. | 351/161 |
| 5,448,312 A | 9/1995 | Roffman et al. | 356/124 |
| 5,452,031 A | 9/1995 | Ducharme | 351/177 |
| 5,570,142 A | 10/1996 | Lieberman | 351/160 R |
| 5,771,088 A | 6/1998 | Perrott | 351/160 R |
| 5,777,719 A | 7/1998 | Williams et al. | 351/212 |
| 5,800,532 A | 9/1998 | Lieberman | 351/161 |
| 5,807,381 A | 9/1998 | Lieberman | 606/5 |
| 5,835,192 A | 11/1998 | Roffman et al. | 356/124 |
| 5,872,613 A | 2/1999 | Blum et al. | 351/177 |
| 5,880,809 A | 3/1999 | Lieberman et al. | 351/160 R |
| 5,929,969 A | 7/1999 | Roffman | 351/160 R |
| 5,949,521 A | 9/1999 | Williams et al. | 351/161 |
| 5,953,098 A | 9/1999 | Lieberman et al. | 351/177 |
| 6,050,687 A | 4/2000 | Bille et al. | 351/161 |

(Continued)

FOREIGN PATENT DOCUMENTS

WO    WO 01/28410 A1    4/2001

(Continued)

OTHER PUBLICATIONS

He, Ji C. et al, The Association of Wavefront Aberration and Accommodative Lag in Myopes, Science Direct, Aug. 7, 2004, pp. 285-290, Vision Research 45 (2005), Elsevier Ltd/.

(Continued)

*Primary Examiner*—Mohammed Hasan
(74) *Attorney, Agent, or Firm*—David E. Heisey; Sheppard Mullin; Richter & Hampton LLP

(57) ABSTRACT

Apparatus and methods are provided for reducing or eliminating the progression of myopia, including a lens having an intentionally created aberration pattern for reducing or eliminating the progression of myopia. The aberration pattern may comprise a positive spherical aberration that produces a wavefront error in which the paracentral wavefront is disposed in front of the retina, thereby producing a signal that counters axial length growth of the eye and preventing the progression of myopia.

14 Claims, 9 Drawing Sheets

U.S. PATENT DOCUMENTS

| | | | |
|---|---|---|---|
| 6,082,856 A | 7/2000 | Dunn et al. | 351/160 H |
| 6,086,204 A | 7/2000 | Magnante | 351/160 H |
| 6,095,651 A | 8/2000 | Williams et al. | 351/161 |
| 6,149,609 A | 11/2000 | Lieberman et al. | 351/160 R |
| 6,199,986 B1 | 3/2001 | Williams et al. | 356/124 |
| 6,234,631 B1 | 5/2001 | Sarver et al. | 351/247 |
| 6,241,355 B1 | 6/2001 | Barsky | 351/177 |
| 6,270,221 B1 | 8/2001 | Liang et al. | 351/177 |
| 6,271,914 B1 | 8/2001 | Frey et al. | 351/247 |
| 6,271,915 B1 | 8/2001 | Frey et al. | 351/247 |
| 6,305,802 B1 | 10/2001 | Roffman et al. | 351/212 |
| 6,338,559 B1 | 1/2002 | Williams et al. | 351/212 |
| 6,340,229 B1 | 1/2002 | Lieberman et al. | 356/124 |
| 6,379,005 B1 | 4/2002 | Williams et al. | 351/212 |
| 6,379,008 B1 | 4/2002 | Chateau et al. | 351/160 R |
| 6,416,179 B1 | 7/2002 | Lieberman et al. | 351/212 |
| 6,460,997 B1 * | 10/2002 | Frey et al. | 351/211 |
| 6,540,353 B1 | 4/2003 | Dunn | 351/161 |
| 6,599,285 B1 | 7/2003 | Lieberman et al. | 264/1.37 |
| 6,761,454 B2 | 7/2004 | Lai et al. | 351/216 |
| 7,150,529 B2 * | 12/2006 | Legerton et al. | 351/177 |
| 2003/0123024 A1 | 7/2003 | Dunn | 351/160 R |
| 2004/0237971 A1 | 12/2004 | Radhakrishnan et al. | 128/898 |

FOREIGN PATENT DOCUMENTS

| | | |
|---|---|---|
| WO | WO 01/89424 A1 | 11/2001 |
| WO | WO 02/30273 A1 | 4/2002 |

OTHER PUBLICATIONS

Evans, Kylie, Press Release; Australia's Vision for the World; Major new global collaboration launched by Minister of Science; Vision CRC Publicity Office.

Evans, Kylie Media Release; Vision CRC Publicity Office; Looking for Answers to Shortsightedness; Myopia Meeting; Mar. 20, 2003.

Chou, Brian; Riding the Wave(front) to Super Vision; Review of Optometry, Patient Care; Apr. 15, 2003.

Cheung, Sin Wan, et al; Asymmetrical Increase in Axial Length in the Two Eyes of a Monocular Orthokeratology Patient; Optometry and Vision Science, pp. 653-656, vol. 81, No. 9 ; Sep. 2004.

* cited by examiner

STEP 1

STEP 4

STEP 2

STEP 5

STEP 3

STEP 6

METHOD AND APPARATUS FOR REDUCING OR ELIMINATING THE PROGRESSION OF MYOPIA

FIELD OF THE INVENTION

The present invention generally relates to methods and apparatus for vision correction, and more particularly to methods and apparatus for reducing or eliminating the progression of myopia.

BACKGROUND OF THE INVENTION

Vision correction is on the verge of a revolution. New technologies to measure the aberrations or distortions in the optics of the eye will soon be available to the public. These new wavefront measurement techniques such as Shack-Hartmann wavefront sensing and Talbot Interferometry can precisely measure the eye's aberrations so that vision may be corrected up to 20/10. Wavefront sensing is the method for rapidly and accurately assessing aberrations in a patient's eye to create a customized prescription for correction.

Once the aberrations have been measured, using conventional methods or by wavefront sensing, the measurements must then be transferred into a vision correction system, such as, spectacles, contact lenses or the patient's eyes. Recent advances in spectacle manufacturing and laser refractive surgery techniques such as LASIK now enable the creation of highly accurate corrective prescriptions for individuals. However, this is not the case with respect to contact lenses. Popular soft contact lenses cannot achieve the same result as spectacles or laser refractive surgery because of dimensional variations in fabrication. Hard contact lenses, which may provide the platform to achieve the results of spectacles, are not as comfortable as soft contact lenses and lack the necessary positional stability on the eye. Hybrid hard-soft contact lenses comprising a hard center portion and a relatively soft outer skirt have been developed to provide a platform for a corrective prescription and also provide the comfort of soft contact lenses. Contact lenses that exhibit high oxygen permeability are generally preferred for the health and comfort of the eye.

Myopia, or nearsightedness, is a condition wherein the axial length of the eye is too long, or the crystalline lens is too strong. As a result, the image of distant objects is brought to a focus in front of the retina such that the image is out of focus before the light strikes the retina. The prevalence of myopia is reaching epidemic proportion globally with an incidence of approximately 25% in the United States and Western Europe to as high as 90% in urban Chinese. The incidence of myopia has been shown to be greater in those persons having a college education. In addition, there is a high correlation between the age of commencing concentrated detailed tasks within arms length and the prevalence and degree of myopia.

Many causative factors for myopia have been suggested, including sustained close work, poor nutrition, the limitation of aerobic exercise, and stress resulting in increased tone in the sympathetic nervous system. Animal studies have established the ability to induce myopia in vertebrates and primates by causing the eye to sustain focusing. This suggests that it may be possible to decrease the progression of myopia through limitation of the focal demand using long term cycloplegia. Additional studies have indicated that the major anatomic factor tied to myopia is axial length, rather than the refractive power of the cornea or the crystalline lens of the eye. There is evidence that the rays of light falling on the far periphery make no contribution to the stimulus for axial length growth. Rather, the nature of the focus of the light on or near the macula is a probable contributor.

The application of adaptive optics has resulted in the development and commercialization of wavefront sensors or aberrometers that measure higher-order aberrations of the human eye. These instruments allow for the quantification of third order aberrations including coma and trefoil, fourth order aberrations including spherical aberration and quadrafoil and higher-order aberrations. A study of pilots with visual acuity better than 20/20 along with excellent visual performance demonstrated the presence of 0.2 micron over 6 mm of vertical coma and 0.1 micron over 6 mm of positive spherical aberration. Further, a study of a population of Asians having myopia demonstrated a lesser amount of each of these aberrations. People having myopia typically are treated with spectacles and/or contact lenses. However, conventional spectacles and contact lenses are designed to correct only low order aberrations.

Hysteresis of the cornea involves the modulus of the cornea, or the ability of the cornea to flex and alter its geometry. Studies have indicated a correlation between myopic eyes and greater hysteresis. When an eye focuses on a close image, greater hysteresis allows the ciliary muscle to exert a force on the sclera and cornea, thereby producing an increase in corneal eccentricity. This increase in corneal eccentricity decreases spherical aberration, which produces a signal that stimulates axial length growth.

Studies of myopic eyes indicate higher eccentricity in the anterior corneal surface with a resultant decrease in spherical aberration. Hyperopic eyes tend to be more spherical with higher spherical aberration, and may remain hyperopic (i.e., too short for their optical system) because axial length growth is impeded when the signal from the paracentral wavefront is too far in front of the plane of focus.

U.S. Pat. No. 6,086,204 to Magnante teaches a method of fabricating contact lens surfaces or corneal surfaces to correct optical aberrations in a patient's eye. The method involves measuring the eye's optical aberrations, performing a mathematical analysis on the eye's optical aberrations and fabricating an aberration-correcting surface on the contact lens or corneal surface. However, Magnante does not disclose the intentional creation of higher-order aberrations to provide a preventive measure to reduce or eliminate the progression of myopia.

U.S. patent application Ser. No. 2004/0237971 to Radhakrishnan et al. discloses a method for controlling optical aberrations to alter modulation transfer functions. An ocular system is provided comprising a predetermined aberration-controlled design for producing corrective stimuli to alter accommodative lag and abate the progression of myopia. However, Radhakrishnan does not disclose the intentional creation of a predetermined aberration pattern comprising a positive spherical aberration that produces a wavefront error in which the paracentral wavefront is disposed in front of the retina.

Therefore, there exists a need for methods and apparatus for reducing or eliminating the progression of myopia.

There also exists a need for methods and apparatus for creating higher-order aberrations in a lens-eye system to provide a preventive measure to reduce or eliminate the progression of myopia.

There further exists a need for methods and apparatus for determining children that are most at risk for developing myopia.

There further exists a need for methods and apparatus for the intentional creation of a predetermined aberration pattern in a lens-eye system, wherein the predetermined aberration pattern comprises a positive spherical aberration that produces a wavefront error in which the paracentral wavefront is disposed in front of the retina.

SUMMARY OF THE INVENTION

In view of the foregoing, it is an object of the present invention to provide methods and apparatus for reducing or eliminating the progression of myopia.

It is an additional object of the present invention to provide methods and apparatus for creating higher-order aberrations in a lens-eye system to provide a preventive measure to reduce or eliminate the progression of myopia.

It is a further object of the present invention to provide methods and apparatus for determining children that are most at risk for developing myopia.

It is a further object of the present invention to provide methods and apparatus for the intentional creation of a predetermined aberration pattern in a lens-eye system, wherein the predetermined aberration pattern comprises a positive spherical aberration that produces a wavefront error in which the paracentral wavefront is disposed in front of the retina.

These and other objects of the present invention are accomplished by providing methods and apparatus for inducing higher-order aberrations in a lens-eye system, thereby reducing the spherical aberration of the lens-eye system and/or reducing or inducing third order aberrations such as coma. According to a preferred implementation of the invention, the lens-eye system includes a hybrid contact lens. According to other embodiments of the invention, the lens-eye system may feature a hard contact lens, a soft contact lens, an intraocular lens, a spectacle lens, or a multi-focal lens. According to further embodiments of the invention, one or more corneal reshaping procedures may be employed to produce an optical path that provides a retinal focus to produce a desired aberration pattern.

One aspect of the present invention involves a contact lens for a myopic eye, the lens including a predetermined aberration pattern to prevent the progression of myopia. Such a predetermined aberration pattern may comprise one or more higher-order aberrations (e.g., spherical aberration, vertical coma, etc.) of a predetermined amount that is modulated for control of refractive error development.

Preferably, the predetermined aberration pattern comprises a positive spherical aberration that produces a wavefront error in which the paracentral wavefront is disposed in front of the retina. This displacement of the paracentral wavefront produces a signal that counters axial length growth of the eye, thereby preventing the progression of myopia. According to other embodiments, the thickness profile of the lens is modified to create the predetermined aberration pattern. Additionally, the optical path of the contact lens may be altered by modifying the index of refraction of the lens over the optical zone.

A preferred contact lens comprises a hybrid contact lens including a gas permeable center portion and a relatively soft peripheral portion that are chemically bonded or stitched together. Such a hybrid contact lens features rigid optics as well as the ability to center an aberration structure over the pupil. Advantageously, the rigid optics prevent or negate substantial changes in anterior corneal geometry during accommodation such that the paracentral wavefront remains substantially constant during use of the contact lens.

Another aspect of the present invention involves a method of creating a contact lens for a lens-eye system including a myopic eye. The method includes the steps of measuring the residual aberrations in the myopic eye using a diagnostic lens and inducing higher-order aberrations in the lens-eye system. The step of inducing higher-order aberrations in the lens-eye system may include the step of reducing or increasing the spherical aberration of the lens-eye system. The step of inducing higher-order aberrations in the lens-eye system may also include the steps of inducing and/or reducing higher-order aberrations in the lens-eye system. Low order aberrations in the lens-eye system preferably are reduced to a subclinical level.

An additional aspect of the invention involves a method of prescribing and fitting a contact lens for an eye, comprising: measuring an ocular surface profile of the fitting lens, a thickness profile of the fitting lens, and low and higher order aberrations of the fitting lens; selecting a fitting lens to conform to the shape of a cornea of the eye; placing the fitting lens in the eye and measuring the registration error and the residual low and higher order aberrations of the lens-eye system; and performing an analysis utilizing the measured ocular surface profile of the fitting lens, the measured thickness profile of the fitting lens, the measured low and higher aberrations of the fitting lens, and the registration error and the residual low and higher order aberrations of the lens-eye system.

A further aspect of the invention involves a method of prescribing and fitting a contact lens for an eye, comprising: selecting a fitting lens to conform to the shape of a cornea of the eye; measuring the registration error and the residual low and higher order aberrations of the lens-eye system; and performing an analysis utilizing the registration error and the residual low and higher order aberrations of the, lens-eye system to determine a preferred aberration prescription for the contact lens.

Another aspect of the invention involves a method of screening a patient's eye to determine the probability of the eye becoming highly myopic, comprising performing aberrometry of the eye to determine an amount of existing spherical aberration and using the determined amount of existing spherical aberration to determine the probability of the eye becoming highly myopic. An additional step may involve measuring the eye's static and dynamic corneal eccentricity and the existing hysteresis in the eye and using the determined amount of existing hysteresis to help determine the probability of the eye becoming highly myopic. A further step may involve screening the eye for the presence and amount of existing accommodative lag and using the determined amount of existing accommodative lag to help determine the probability of the eye becoming highly myopic.

Figure 1:
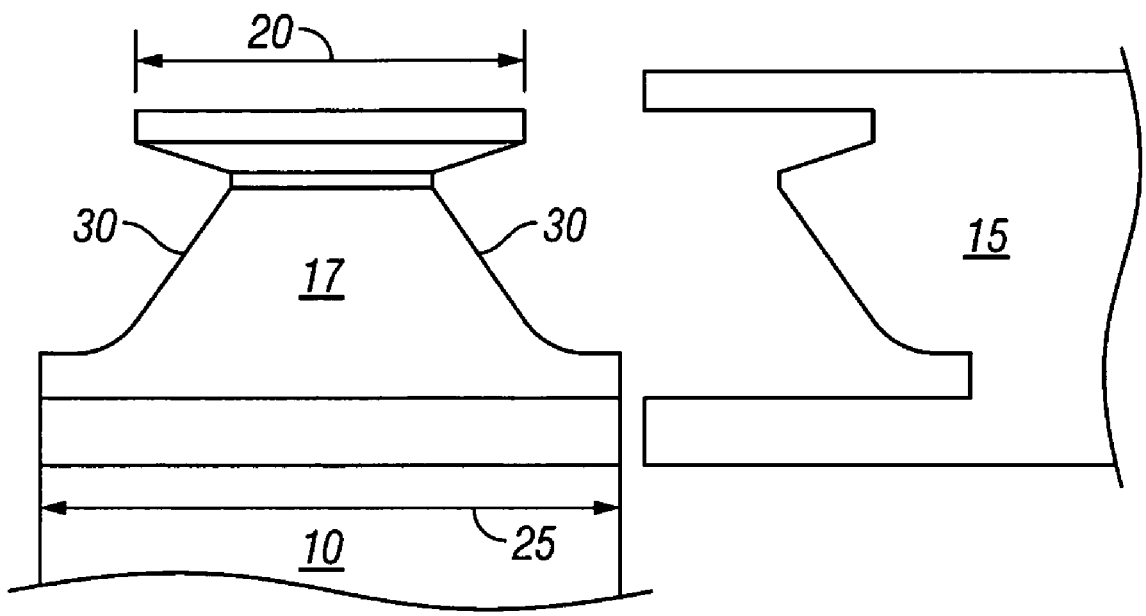
FIG. 1 depicts a manufacturing step used to construct a hybrid hard-soft contact lens of the present invention; r is cast having the desired characteristics.
Figure 2:
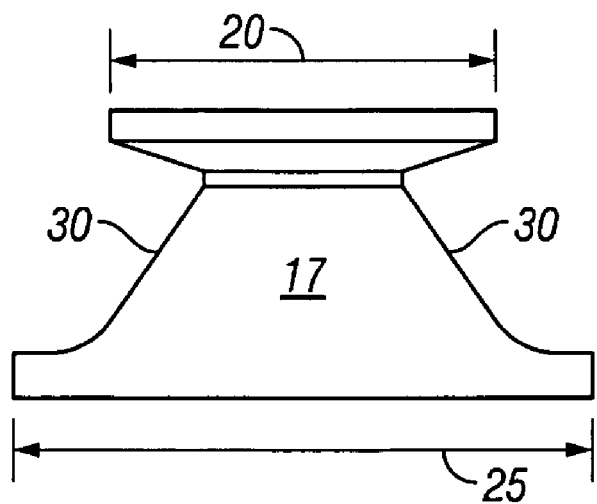
FIG. 2 depicts a contact lens blank after the manufacturing step illustrated in FIG. 1.
Figure 3:
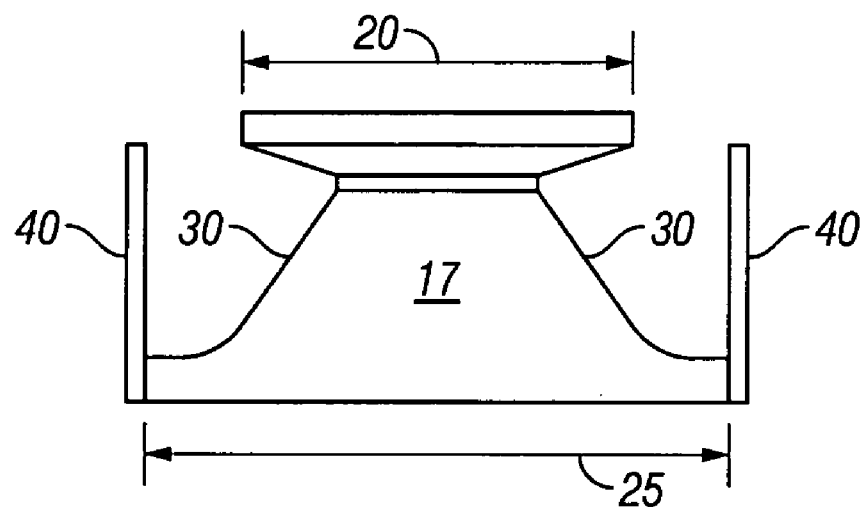
FIG. 3 depicts another manufacturing step used to construct a hybrid hard-soft contact lens of the present invention.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is based on a hybrid contact lens platform that offers the benefits of both soft contact lenses (e.g., superior eye comfort and health) and gas permeable contact lenses (e.g., superior stability, optics and durability). Lens chemistry, manufacturing processes, optical design, and prescribing and fitting processes for the contact lenses of the invention are hereby provided in the following description. One feature of the manufacturing processes and optical design elements is the ability to make quarter wavelength customization in order to correct for higher-order refractive aberrations that limit one's ability to see better than 20/20. The anterior or posterior surface of the rigid portion may also have surface modification to correct the total low and higher order aberrations of the lens-eye system. Another feature of the invention concerns the ability to intentionally create higher-order refractive aberrations to provide a preventive measure to reduce or eliminate the progression of myopia.

As used herein, "hybrid" refers to a type of contact lens that includes both hard and soft lens elements that are chemically bonded or stitched together. One embodiment of the present invention involves a hybrid lens that combines the optical clarity, stability and durability of a gas permeable lens with the comfort of a soft contact lens. This hybrid lens has a high or hyper DK gas permeable center chemically bonded to a wettable soft outer skirt. The center is highly oxygen permeable, which is important to maintaining corneal health, whereas the peripheral portion may also be highly oxygen permeable. As used herein, all stated DK values have units of $(\times 10^{-11})$ $[cm^3/sec][ml\ O_2/ml\ mm\ Hg]$. Thus, when the center portion of a contact lens is disclosed as having a DK value of 40, it is to be understood that the DK value is 40 $(\times 10^{-11})$ $[cm^3/sec][ml\ O_2/ml\ mm\ Hg]$.

Methods of Manufacturing a Hybrid Contact Lens

Referring to FIGS. 1-5, one method of manufacturing a hybrid contact lens according to the present invention will now be described. This method results in a fracture resistant contact lens that is inexpensive to manufacture.

Shown in FIG. 1, a rod 10 of substantially rigid, gas permeable, high (or hyper) DK material is cast having the desired characteristics. Upon the completion of the curing the rod is precision ground to produce a substantially uniform diameter. The rod is then machined by tool 15 into a primary blank 17 having an anterior diameter 20 designed to conform to the collet of a computer numerically controlled lathe and a posterior diameter 25 designed to conform the outermost diameter of the hydrophilic portion of the lens for positioning in a tube, cup, or other containing device. The anterior diameter 20 may range from 6 millimeters (mm) to 24 mm, and the posterior diameter 25 may range from 6 mm to 24 mm. In one embodiment, the anterior diameter 20 may be a separate material that is bonded or otherwise attached to the primary blank 17 for enduring the clamping force of a lathe. The intermediate portion of the primary blank 17 is simultaneously machined to have a predetermined angle 30 for the interface of the rigid and hydrophilic material in the finished lens.

Figure 4:
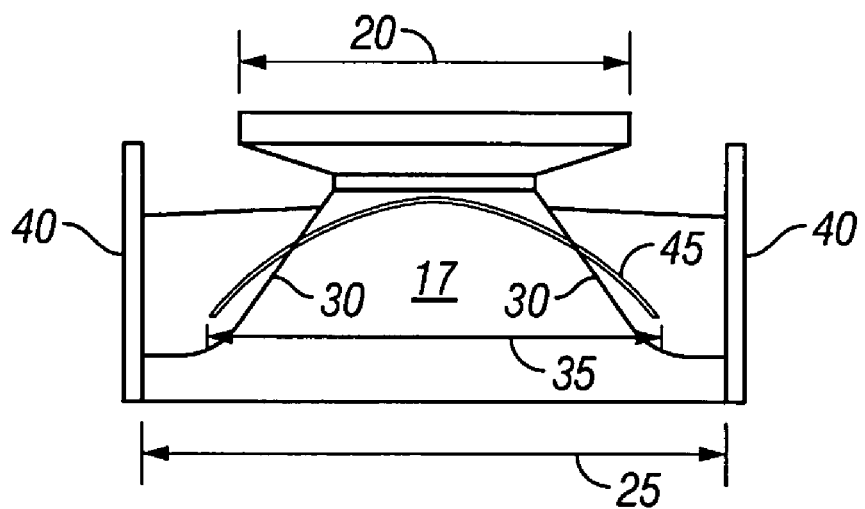
FIG. 4 depicts another manufacturing step used to construct a hybrid hard-soft contact lens of the present invention.

One manufacturing method of the present invention has the posterior diameter 25 substantially meet, or exceed, the hydrophilic section outermost diameter 35, that is, the outermost diameter of the soft section of the contact lens, as shown in FIG. 4. In this embodiment, a boundary material 40 is then applied to produce a resultant wall, or cup to receive, and retain the hydrophilic liquid polymer. Alternatively, the primary blank 17 may be inserted into a cup, tube or other containing device to receive the hydrophilic material.

An alternative manufacturing method involves the application of an adhesion promoter to the primary blank 17, followed by the casting of the hydrophilic polymer into the liquid holding device formed by the boundary material 40, tube, cup or other containing device. In another alternative embodiment, the primary lens blank 17 is mounted via the anterior diameter 20 in the collet of a computer numerically controlled lathe that is programmed to produce the aspherical posterior surface profile in a manner that the profile does not require polishing, or may only need a light buff, or polish. The posterior surfaced button is then mounted to a lens block wherein the axis of the block passes through the geometric center of the lens 45, shown in FIG. 4.

The assembly with the posterior surfaced button is remounted in the collet of a computer numerically controlled lathe, such as the Optoform 80 with Variform attachment, or equivalent type that is capable of producing rotationally symmetrical or non-symmetrical surfaces to high, or quarter wavelength accuracy that preferably require a light buff, or no supplemental polishing (VARIFORM and OPTOFORM are trademarks of Precitech, Inc., of Keene, N.H.). It will be appreciated to those skilled in the art that other types of lathes may be employed. The finished lens is removed from the lathe, deblocked and cleaned, followed by anterior lens surface treatment. Finally the lens undergoes hydration-extraction, sterilization and packaging.

Figure 5:
FIG. 5 depicts an alternative manufacturing method of constructing a hybrid hard-soft contact lens of the present invention.
Figure 5:
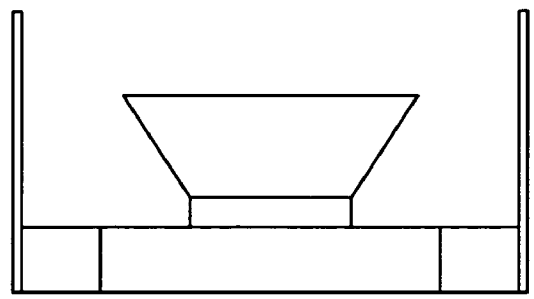
Figure 5:
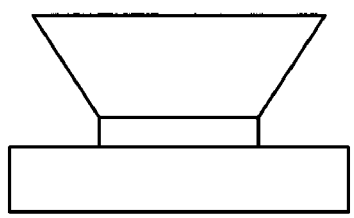
Figure 5:
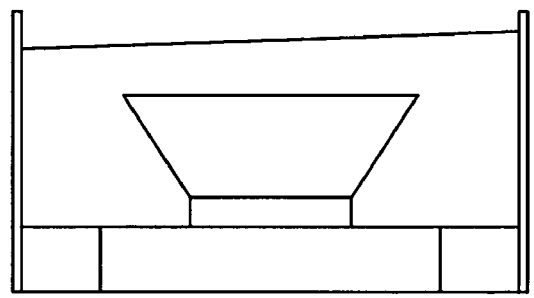
Figure 5:
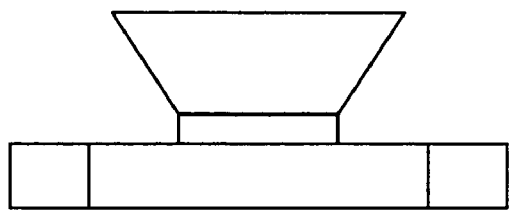
Figure 5:
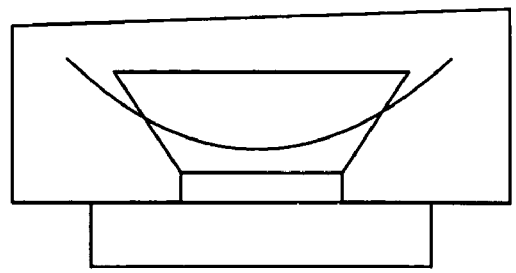

Another method of manufacturing a hybrid contact lens according to the present invention is illustrated in FIG. 5. Step 1 shows a rod of fluorosiloxane acrylate RGP material that will comprise the substantially rigid section of the hybrid contact lens. It will be appreciated to those skilled in the art that other types of materials may be employed. These other materials may include the following monomers, monomer mixtures, or their derivatives: methyl methacrylate; ethyl methacrylate; butylmethacrylate, hexylmethacrylate, ethylene glycol diacrylate; octafluoro pentyl methacrylate, tetramethyldisiloxane, ethylene glycol dimethacrylate, pentafluoro phenylacrylate, 2-(trimethylsiloxyl)ethyl methacrylate, 2,2-bis(2-metharyloxyphenyl) propane, N-[2-(N,N-dimethylamino)ethyl]acrylate, 2-(N,N-dimethylamino)ethyl methacryalte, 2-(N,N-dimethylamino)propy acrylate, N-vinyl-2-pyrrolidone, N,N-dimthylacrylamide, acrylamide, acrylamine, 2-hydroxyethyl methacrylate, siloxane-ethylene glycol dimethacrylate, trifluoroethyl methacrylate, pentafluorostyrene, pentafluorophenyl methacrylate, pentafluorophenyl acrylate, pentafluoropropyl methacrylate, unsaturated polyester; p-vinyl benzylhexafluoroisopropyl ether, siliconylstyrene, siloxanyl alkylmethacrylate, and siloxanylalkylamide.

The rod, or button shown in Step 1 of FIG. 5, will preferably have a 5 millimeter (mm) to 22 mm diameter and be 2 mm to 15 mm in length. In one embodiment, the button may be bonded to another material for a subsequent operation, and as a possible cost saving. In Step 2, a plunge tool is used to remove unnecessary hard material and allow a solid section of material on one side for subsequent operations. Another method may use the plunge tool to form the button assembly from Step 1, with a shape similar to FIG. 2.

In Step 3, a spacer is formed on the gripping side of the blank for the next operation, or the blank can be bonded to a pre-form containing device to skip Step 4. In Step 4, a tape, or other media that provides a retaining wall to hold the soft material during polymerization is applied to the blank. In Step 5, an adhesion promoter may be applied to the hard material and then the soft material is poured inside the retaining wall, or other containing device, and allowed to cure using heat, V, or combination of heat and WV. In Step 6, the spacer, or containing device, is removed and the blank is ready for subsequent manufacturing operations.

Figure 6:
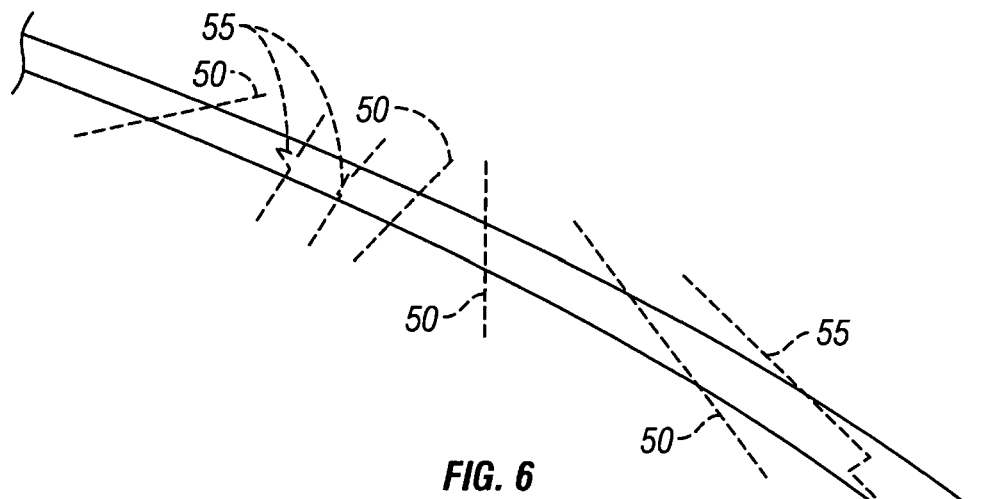
FIG. 6 depicts several embodiments of interface geometries between a hard section and soft section of a hybrid hard-soft contact lens constructed according to the present invention.

Referring to FIG. 6, methods of coupling the hard section of the contact lens to the soft section will now be described. Conventional hybrid contact lenses are generally not durable, in part because of the weak chemical bonding between the hard and soft sections of the lens. Bonding failure may cause cornea scratching and also cost for replacing the lens. One feature of the present invention is that a variety of coupling configurations are contemplated that securely couple the hard and soft sections of a hybrid contact lens.

One embodiment of the present invention employs an angled, or sloped surface between the hard and soft contact lens sections, thereby increasing the surface area, and thus the bonding force, or strength between the two sections. Other embodiments use a variety of different surface features, or surface geometries that increase the durability and comfort of a hybrid contact lens.

For example, the bonding angle 50, shown in FIG. 6, may vary from almost 0 degrees to almost 90 degrees. That is, if a contact lens constructed according to the present invention was pressed against a flat surface, the angle defined by the interface between the hard and soft sections of the lens could vary from almost parallel to the flat surface to almost perpendicular to the flat surface. In addition, the interface between the hard and soft sections of the contact lens may include a variety of surface configurations, or geometries 55. As shown in FIG. 6, these surface geometries 55 may include ledges, protuberances, or substantially V— or W-shaped projections. Other surface geometries 55 may include serrations, gradations, or any other shape that is not substantially straight, or planar.

Figure 6A:
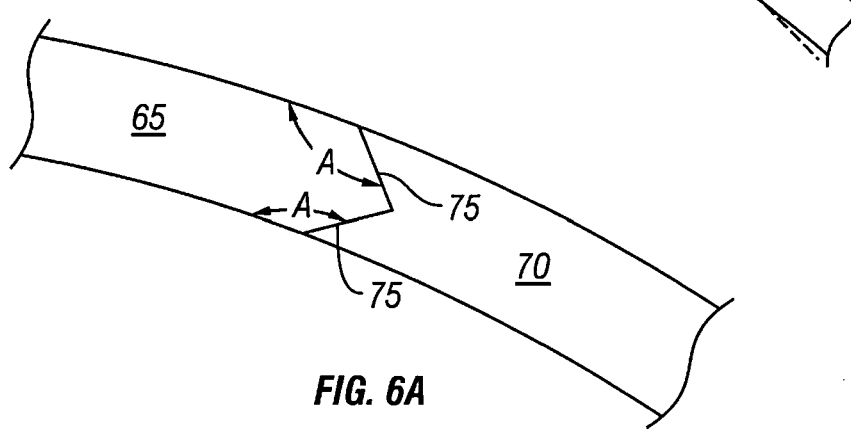
FIG. 6A depicts a preferred embodiment of an interface geometry between a hard section and soft section of a hybrid hard-soft contact lens constructed according to the present invention.

Referring now to FIG. 6A, a hard-soft lens bonding method is illustrated. In this embodiment of the present invention, increasing the surface area between the rigid and soft lens components increases bonding strength between the two materials and minimizes lens breakage, or failure. Another advantage of this embodiment is that it provides a smooth transition between the rigid or hard, and soft materials. This produces an exceptionally comfortable lens.

As shown in FIG. 6A, an interface, or junction 75 between the hard, or substantially rigid lens material 65, and the soft lens material 70 is illustrated. Also shown is angle "A" that may range between about 95 degrees to about 170 degrees. Angle A preferably ranges between about 110 degrees to about 165 degrees. As illustrated, the interface between the hard, or substantially rigid lens material 65, and the soft lens material 70 is substantially V-shaped. Put differently, the interface comprises two intersecting planes that meet within the lens. This lens junction configuration provides a safety feature in the unlikely case of lens material separation during wear. Because of the V-shape, the edge of the hard lens material 65 is not "blade" shaped, and thus a sharp edge will not contact the cornea or eyelid, eliminating the risk of cuts, or abrasions.

The hard and soft sections of a contact lens constructed according to the present invention may be joined, or coupled by a bonding material or resin comprised of the following monomer mixtures or their derivatives: vinyl acetate; trifluoroethanol; methyl methacrylate; ethyl methacrylate, butylmethacrylate, ethylene diamine; 2-hydroxyethyl methacrylate (HEMA) and other esters of methacrylic and acylic acids with C1 to C6 carbon formulated from acrylic bases with fluorinated alkyl or aryl, silicone, styrene moiety in the structure and resultant polymers such as polystyrene; fluorine/styrene; and silicone/styrene.

The soft section of the contact lens constructed according to the present invention may be comprised of a variety of materials. These materials may include: poly HEMA; hydroxyethyl acrylate; dihydroxypropyl methacrylate; butylmethacrylate, hexylmethacrylate, perfluorinated methacrylate esters, polyethylaneglycol; acetoxysilane; (trimethylsiloxyethyl)methacrylate; trimethylsiloxy; ethyleneglycol-dimethacrylate; phenylethyl acrylate; polyethylene oxide; and silicon hydrogels. It will be appreciated to those skilled in the art that other types of materials may be employed.

Hybrid Contact Lens Surface Treatments

One feature of the present invention is that a variety of contact lens surface treatments are contemplated. These surface treatments may be added, for example, for the purpose of improving the comfort of the lens by means of improving the in-vivo wetting of the lens material. Another reason for using surface treatments is to create a uniform pre-lens tear film thickness. Variations in pre-lens tear film thickness induce aberrations while a uniform pre-lens tear film thickness allows the other aberration corrections to reach full effectiveness.

One embodiment of a hybrid contact lens constructed according to the present invention may include a surface treatment that provides uniform pre-lens tear film thickness between normal blinking actions. These treatments may comprise one or more of the following embodiments: (1) plasma; (2) ionic surfactants; (3) non-ionic surfactants; and (4) soluble polymers.

During a plasma surface treatment, the lens is placed in the presence of gases such as oxygen and $NH_2$ containing compounds, that are modified by oscillating electromagnetic energy. This creates a surface functionalization (oxidation) that generates functional groups such as OH or NH on the lens surface, which make the lens surface more wettable. Ionic surfactant surface treatments involve polar molecules that are presented to the ionic lens surfaces with a resultant bonding of the molecules to the surface. An example is sodium dodecyl sulfide. The 12-carbon chain combined with lauryl sulfonic acid provides a substrate that supports a more uniform tear film thickness.

When using s non-ionic surfactant treatment, the lens is exposed to non-ionic surfactants that provide a film on the lens. An example is an ethylene glycol chain. Soluble polymer surface treatments involve films of soluble polymers that are applied to the rigid gas permeable material after manufacturing. Examples include N,N-dimethyacrylamide, methacylamide, HEMA, and other hydrophilic monomers. Of course, other types of surface treatments are possible without departing from the scope of the present invention.

Methods of Prescribing and Fitting a Hybrid Contact Lens

The present invention also involves methods of prescribing and fitting a hybrid contact lens. One method relates to non-rotating lenses for correcting higher order aberrations that include methods of placing the coordinates of the aberration measurement over the coordinates of the pupil. Another method involves placing a multi-focal lens over the coordinates of the pupil and customizing the design of the multi-focal lens with measurements of higher order aberrations and pupil size.

A further method of prescribing and fitting a hybrid contact lens according to the principles of the present invention employs a set of precision hybrid lenses with spherical, aspherical or toroidal posterior surfaces and spherical, aspherical or toroidal anterior surfaces. One embodiment for a mono-focal lens includes an aspherical posterior surface and a spherical anterior surface. A similar embodiment for a multi-focal lens includes an aspherical posterior surface and an aspherical anterior surface.

A preferred method of prescribing and fitting a hybrid contact lens according to the present invention involves the use of a central registration mark or marks concentric with the geometric center of the lens. The mark(s) may be placed on either the anterior or posterior surfaces or within the matrix of either the rigid central portion, the intermediate adhesion enhancement zone or in the soft portion of the contact lens. According to some embodiments, the rigid portion is at least 9 mm in diameter and a minimum of three marks are placed at a chord diameter of about 8 mm. The diameter of the entire lens is approximately 14.0 mm.

In operation, a contact lens with a rigid posterior surface is placed on the eye and allowed to equilibrate. A lens is chosen that approximates the sagittal depth of the eye over the chord diameter of the rigid portion. The degree of rotational and translational movement is observed. According to some embodiments, the movement observed should be less than 5 degrees rotational and 0.3 mm translational. Upon determination that the movement meets these limits, the residual low and higher order aberrations are measured through the lens, along with the relative coordinates of the lens marks and the pupil margin, limbal margin and/or other anatomical features.

An alternative embodiment of the present invention may include infrared-responsive marks, such as one or more registration marks, one or more concentric marks, or other suitable marks, which emit or reflect infrared light. For example, some types of wavefront aberrometers employ infrared light, which is generally in the form of a laser. During examination of an eye fitted with a hybrid hard-soft contact lens constructed according to the present invention, the infrared-reflecting marks in the hybrid lens are easily visible, thereby enabling simultaneous evaluation of registration error and various aberrations. In one embodiment, indocyan green dye that fluoresces when exposed to infrared light is utilized. Alternatively, other ultraviolet and/or infrared-responsive dyes, powders and other products may be employed.

Another method of prescribing and fitting a hybrid contact lens involves a set of precision rotating and non-rotating hybrid contact lenses having known ocular surface profiles, optical corrections and thickness profiles. In one embodiment, the lenses contain a circumferential mark and intersecting radial mark. A lens is selected and applied to the eye and allowed to equilibrate. The coordinates of the marks and the pupil are determined, and the aberrations of the lens-eye system are measured. A mathematical model provides analysis of the known lens fingerprint, thickness profile, the registration error of the coordinates of the lens and pupil, and the residual lens-eye aberrations. Computer controlled lathe files are derived for diamond turning a resultant thickness profile for a final contact lens having the same ocular surface profile.

For example, one prescribing and fitting method of the present invention includes the steps of: (1) selecting the initial lens to conform to the shape of the underlying cornea; (2) placing the fitting lens into the eye and capturing an image of the circumferential mark, the radial mark and the pupil margin; (3) measuring registration error and the residual low and higher order aberrations of the lens-eye system; and (4) performing analysis utilizing the registration error and the residual lens-eye aberration error to determine the resultant files for generating a final contact lens.

According to additional embodiments of the invention, the aberration fingerprint of the fitting lens is measured in addition to measuring the aberration fingerprint of the lens-eye system. Advantageously, this permits the eye care practitioner to establish the effect that switching fitting lenses will have on the lens-eye system. Thus, another prescribing and fitting method of the present invention includes the steps of: (1) measuring the ocular surface profile of the fitting lens, the initial lens thickness profile, low and higher order aberrations of the fitting lens (2); selecting the initial fitting lens to conform to the shape of the underlying cornea; (3) placing the fitting lens in the eye and measuring registration error and the residual low and higher order aberrations of the lens-eye system; and (4) performing an analysis utilizing the measured ocular surface profile of the fitting lens, the measured thickness profile of the fitting lens, the measured low and higher aberrations of the fitting lens, and the registration error and the residual low and higher order aberrations of the lens-eye system.

Another method of prescribing and fitting a hybrid contact lens employs a set of contact lenses having a known central zone ocular surface geometry, thickness, anterior surface geometry and diameter. The preferred residual lens-eye aberration correction and coordinate disparity are determined by clinical measurement, and the thickness profile variation is derived by computer modeling, or other methods, in order to specify a superiorly performing lens.

Yet another method of prescribing and fitting a hybrid contact lens employs a set of contact lenses with fixed ocular surface geometries, overall diameters and front surface geometries. Clinical measurements are made from which the final prescription parameters are derived by computer modeling, or other methods.

Another method of the present invention comprises correcting the wavefront when accommodative lag is present by providing a multi-focal lens. The method uses a set of hybrid contact lenses having a known ocular surface profile and thickness profile, and containing circumferential marks for the purpose of registration of the final optical correction with the coordinates of the optical system of the eye. The method steps include: selecting the initial lens to conform to the shape of the underlying cornea; capturing an image of the circumferential mark, radial mark and the pupil margin; measuring the size of the pupil in photopic, mesopic and/or scotopic illumination; measuring the residual low and higher order aberrations of the lens-eye system; and performing analysis utilizing the known ocular surface profile, the initial lens thickness profile, the registration error, the pupil size and the residual lens-eye aberration error to determine prescription information for generating a final contact lens. The diameter of the near focused optical correction preferably is in the range of about 1.5 mm to about 4.0 mm.

The above-described methods of prescribing and/or fitting a hybrid contact lens may also employ additional method steps or additional devices. For example: the method of determining the difference in the coordinates of the center of the circumferential lens marks and the pupil margin may incorporate a reticle of a biomicroscope or a camera with subsequent manual or electronic digital image detection. In addition, the method of measuring the residual aberrations of the lens-eye system may incorporate Shack-Hartmann aberrometry, aberrometers utilizing Tscheming technology, laser ray-tracing, holographic grid or Talbot interferometry technology.

Correction for Various Components of the Visible Light Spectrum

Figure 7:
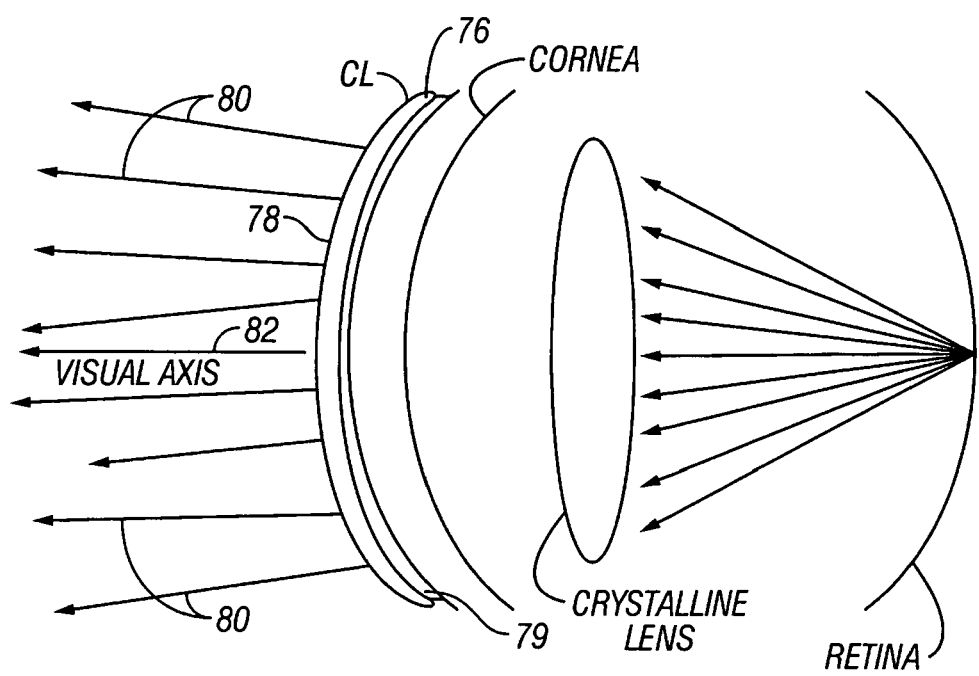
FIG. 7 depicts a contact lens, several eye components and visible light rays exiting the eye-contact lens system.

Referring to FIG. 7, aberrometry performed with contact lens 76 in place provides an indication of the angles that emerging rays 80 from anterior lens 78 make with respect to visual axis 82. Ideally, the emerging rays all emerge substantially parallel to visual axis 82. However, in the presence of aberrations, the emerging rays are disposed at various angles with respect to the visual axis, wherein the angles are not restricted to the plane of the paper. There are two variables that may be modulated to correct the aberrations. The first variable is the slope of contact lens 84 at the point that each ray emerges from the contact lens. Changing this slope will change the direction of the ray exiting the eye via Snell's Law. There exists a slope of the anterior contact lens surface 78 or posterior contact lens surface 79 that causes the ray to exit substantially parallel to the visual axis.

The second variable is the local lens thickness at the point where each ray exits contact lens 76. As the local lens thickness is adjusted, the slope of one or both of the surfaces for the path of the ray is changed in order to keep the emerging ray substantially parallel to visual axis 82. There exists a set of local thicknesses and slopes that simultaneously cause all emerging rays 80 to be substantially parallel to the visual axis.

Figure 8:
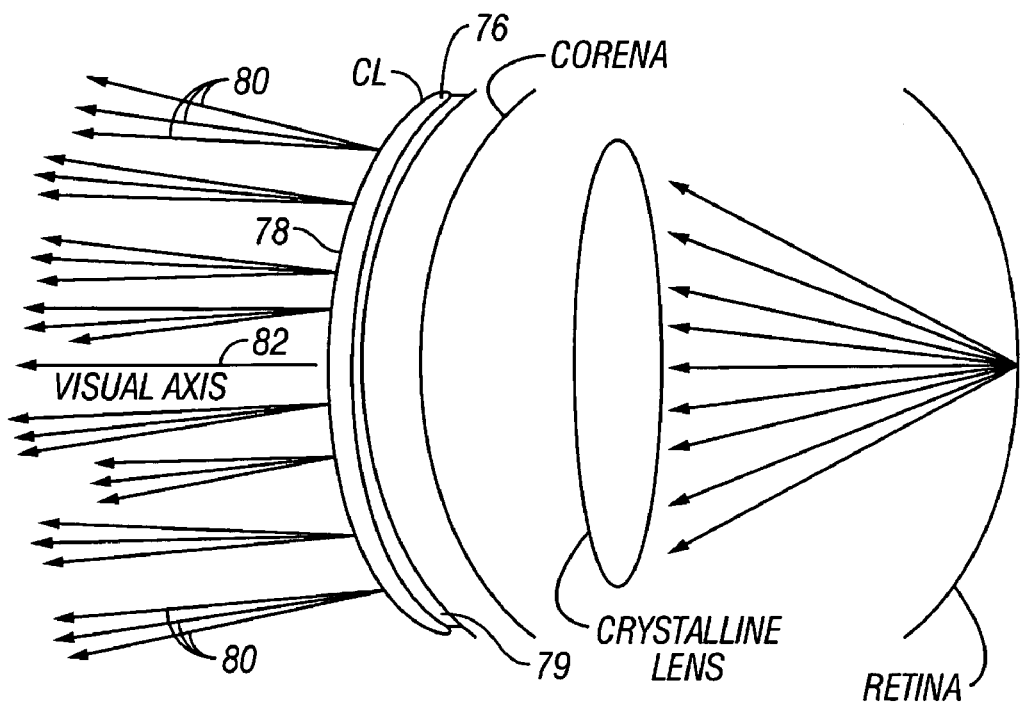
FIG. 8 depicts a contact lens, eye components and visible light rays, showing the tendency for different colored light rays to exit the eye at different angles.

Aberrometry typically is performed at only one wavelength, usually in the infrared spectrum. However, as illustrated in FIG. 8, the slopes of the various emerging rays 80 will depend on the color of the light. In general, blue lights rays will be more convergent than the green light rays, whereas red light rays will be more divergent than the green light rays. The question becomes which emerging color rays should be made substantially parallel to visual axis 82. If the eye responded equally to all colors in the visible range (wavelengths of about 380 nanometers (nm) to about 780 nm), then the emerging rays that correspond to the middle wavelength should be made substantially parallel to visual axis 82. In this manner, approximately half of the light is diverging as it leaves the eye, and half of the light is converging as it leaves the eye.

Figure 9:
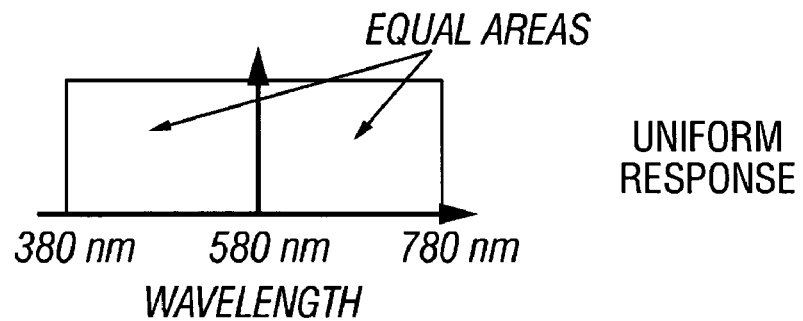
FIG. 9 depicts a hypothetical uniform eye response to the visible light spectrum.
Figure 10:
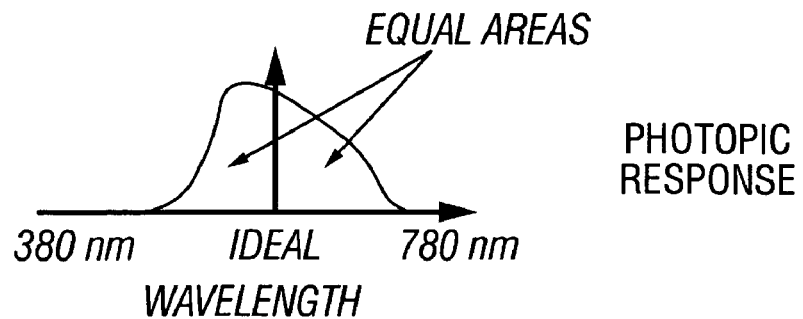
FIG. 10 depicts a photopic eye response to the visible light spectrum.

Referring to FIG. 9, the approximately equal areas of the rectangles on either side of the wavelength means that an approximately equal amount of energy is distributed on either side of the wavelength. The center wavelength of the visible spectrum is the preferred wavelength for correcting aberrations to achieve a substantially uniform response. However, the eye does not respond to all wavelengths in the same manner. The photopic response curve, illustrated in FIG. 10, shows that the eye is more sensitive to the red/green end of the spectrum. The preferred wavelength is determined by selecting the wavelength that yields approximately equal amounts of energy on either side of the wavelength, as shown in FIG. 10.

Figure 11:
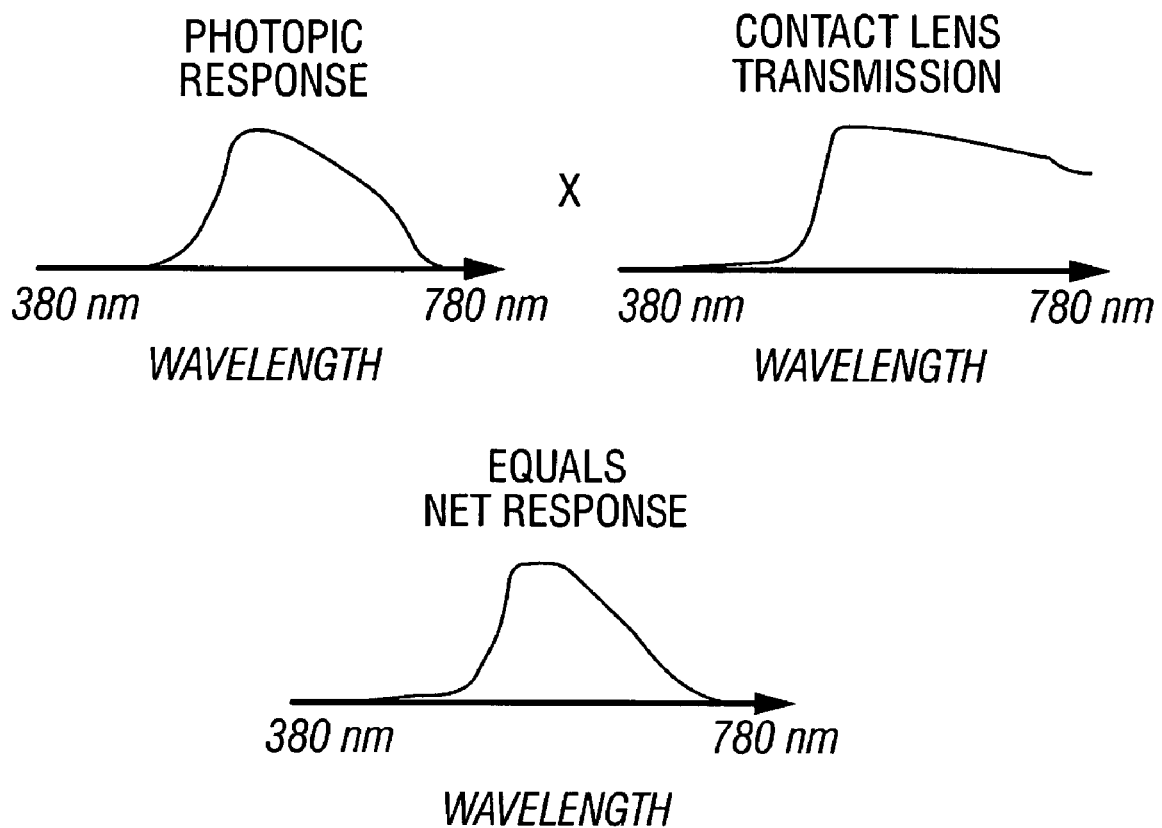
FIG. 11 depicts one idealized net wavelength response for a contact lens constructed according to the present invention.

According to the principles of the present invention, the transmission of the contact lens may be varied with respect to different colors. The varied transmission may be employed to reduce the effects of chromatic aberration in the eye. Referring to FIG. 11, the net response of the eye is calculated by multiplying the contact lens transmission is by the photopic response of the eye. One preferred wavelength is based on the net response that yields approximately equal areas on either side of the wavelength. This preferred wavelength is employed as the target for correcting aberrations using the methods described hereinabove.

According to some embodiments of the invention, the contact lens may include color additives for the purpose of reducing light transmission, or color additives for the purpose of reducing chromatic aberration. By reducing the transmission at both the blue and red end of the visible spectrum, the band of transmitted light is narrowed and the peak of the transmission curve of the lens may be shifted.

Preferred Embodiment for the Prevention of Myopia using Wavefront Analysis

Wavefront analysis is a method of quantifying the aberrations of a patient's eye, which include lower-order aberrations such as astigmatism and higher-order aberrations such as spherical aberrations. Lower-and higher-order aberrations combine to make up the total optical aberrations of the eye. First order aberrations include tilt, whereas second order aberrations include defocus and astigmatism. Third order aberrations include trefoil and coma, whereas fourth order aberrations include spherical aberration, secondary astigmatism and quadrafoil.

The present invention involves the intentional creation of higher-order aberrations in a lens-eye system to provide a preventive measure to reduce or eliminate the progression of myopia. According to a preferred embodiment, positive spherical aberration is induced in the lens-eye system. Additional embodiments involve the intentional creation of other higher-order aberrations such as coma.

According a preferred implementation of the present invention, a predetermined aberration pattern is purposefully created in a contact lens as a preventive measure to reduce or eliminate the progression of myopia in a patient's eye. The predetermined aberration pattern preferably is selected to induce a positive spherical aberration in the lens-eye system comprising the contact lens and the patient's eye. The preferred contact lens is a hybrid contact lens (as described hereinabove), which features: (1) superior eye comfort and health associated with soft contact lenses; (2) superior stability and optics associated with gas permeable contact lenses; and (3) the ability to prevent or negate substantial changes in anterior corneal geometry during accommodation such that the paracentral wavefront remains substantially constant during use of the contact lens. As would be appreciated by those of ordinary skill in the art, conventional soft and hard contact lenses may also provide a platform for the creation of the predetermined aberration pattern, without departing from the scope of the present invention.

According to other embodiments of the invention, a predetermined aberration pattern is purposefully created in a spectacle lens as a preventive measure to reduce or eliminate the progression of myopia. The predetermined aberration pattern preferably is selected to induce a positive spherical aberration in the lens-eye system comprising the spectacle lens and the patient's eye. Alternatively, a predetermined aberration pattern may be created in a multi-focal lens, wherein the aberration pattern is chosen to induce a positive spherical aberration in the lens-eye system comprising the multi-focal lens and the patient's eye. The multi-focal lens serves to reduce the impact of accommodative lag on the wavefront in the retinal plane. Due to the accommodative lag, the entire wavefront is deposed behind the retina, thereby sending the same signal as a negative spherical aberration.

According to further embodiments of the invention, a predetermined aberration pattern is purposefully created in the anatomy of the patient's eye as a preventive measure to reduce or eliminate the progression of myopia. Specifically, the patient's cornea is reshaped to modify the resultant optical path to create a correction that reduces or prevents the progression of myopia. The predetermined aberration pattern preferably is selected to induce a positive spherical aberration in the patient's eye. According to additional embodiments of the invention, a predetermined aberration pattern is purposefully created in an intraocular lens as a preventive measure to reduce or eliminate the progression of myopia. Again, the predetermined aberration pattern preferably is selected to induce a positive spherical aberration in the patient's eye.

Figure 12:
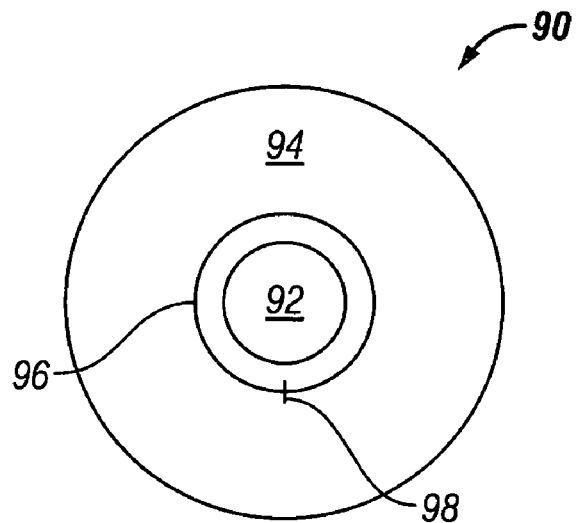
FIG. 12 is a front view of a hybrid fitting lens constructed according to the present invention.

Referring to FIG. 12, fitting lens 90 is employed for fitting and obtaining a corrective prescription for a contact lens. In the preferred embodiment of the invention, the fitting lens is designed to be a hybrid contact lenses, such as described hereinabove. According to other embodiments, the fitting lens is used to fit and obtain corrective positions for other types of contact lenses, such as conventional hard contact lenses, soft contact lenses or multi-focal contact lenses. Fitting lens 90 comprises central portion 92, peripheral portion 94, circumferential mark 96 and radial mark 98. Central portion 92 preferably has an outer diameter that is at least as large as the outer diameter of the lens wearer's iris. Central portion 92 of hybrid contact lens 90 comprises the optical zone that provides corrective vision to the wearer. The central portion may have a diameter that ranges between about 4.0 mm to about 12.0 mm, whereas peripheral portion 94 may have an outer diameter that ranges between about 10.0 mm to about 18.0 mm.

Of interest to an eye care practitioner during the process of obtaining a corrective prescription, is the relative relationship between the patient's contact lens and the center of the patient's eye pupil or the visual axis of the patient's eye. Often, an individual's contact lens is not aligned with the center of their pupil or not aligned with the visual axis of their eye. This misalignment is known as registration disparity or registration error. To obtain a highly accurate corrective prescription, it is desirable to know this registration error so that the corrective prescription can be placed in the correct location on the contact lens.

According to the present invention, a preferred method of prescribing and fitting the contact lens involves placing the fitting lens 90 on a patient's eye, and using the marks 96, 98 to determine the registration error. The residual optical errors are also determined, and a final contact lens prescription is obtained. The contact lens preferably is manufactured to include quarter-wavelength customization in order to reduce or eliminate the progression of myopia. According to other embodiments of the invention, a method of prescribing and fitting a multi-focal lens involves placing a multi-focal fitting lens over the coordinates of the pupil and customizing the design of the multi-focal lens with measurements of higher order aberrations and pupil size.

With further reference to FIG. 12, circumferential mark 96 and radial mark 98 may be placed on either the anterior or posterior fitting lens surfaces or within the matrix of either the central portion 92, or in the peripheral portion 94 of fitting lens 90. In one embodiment, circumferential mark 96 and radial mark 98 are both located on peripheral portion 94 of fitting lens 90. The marks may be visible to the eye under ambient light, or they may be visible by employing infrared light or other narrow bandwidth light such as produced with a cobalt filter. In addition, the marks may be made visible by varying of the index of refraction of the fitting lens material. It is preferred that the circumferential mark 96 and radial mark 98 intersect each other, such as depicted in FIG. 12. The fitting lens is structured to be placed on an individual's eye such that the eye care practitioner can view the individuals eye pupil and contact lens. Then, the eye care practitioner uses circumferential mark 96 and/or radial mark 98 to determine any registration error in the individual's eye. Advantageously, since the eye care practitioner knows the diameter of circumferential mark 96, the registration error may be determined even if only a portion of the marks are visible.

According to an aspect of the invention, fitting lens 90 is used to determine the rotational and translational registration error of the lens-eye system. That is, circumferential mark 96 and radial mark 98 facilitate determining a lens-eye rotational and translational registration error relative to the center of the pupil or to the visual axis of the eye. In practice, fitting lens 90 is placed on a patient's eye and allowed to equilibrate. The fitting lens may be adapted to equilibrate to a known orientation, for example by modulating the thickness profile of the lens, as is known in the art. The marks are detectable by a corneal topographer, an aberrometer, a video keratography system, or other devices employed by an eye care practitioner or contact lens provider. Using the marks as a reference, the registration error of the contact lens on eye can be determined, and a contact lens incorporating a correction for the registration error can be manufactured. More particularly, the location and orientation of the corrective prescription are moved on the contact lens based on the determined registration error information.

Additionally, every lens-eye system has a unique set of residual aberrations referred to herein as the residual aberrations of the lens-eye system. The residual aberrations are measured through the fitting lens, along with the relative coordinates of the lens marks and the pupil margin, limbal margin and/or other anatomical features. According to an additional aspect of the invention, fitting lens 90 is employed to determine a predetermined aberration pattern for the lens-eye system. The predetermined aberration pattern preferably is selected to induce a positive spherical aberration in the lens-eye system. The residual aberrations, registration error and predetermined aberration pattern are used to determine the preferred aberration prescription for the patient's eye.

An alternative embodiment of the present invention may include infrared-responsive marks, such as one or more registration marks, one or more concentric marks, or other suitable marks, which emit, reflect or are excited by infrared light. For example, some types of wavefront aberrometers employ infrared light, which is generally in the form of a laser. During examination of an eye fitted with a fitting lens constructed according to the present invention, the infrared-reflecting marks in the fitting lens will be easily visible, enabling simultaneous evaluation of registration error, as well as any residual aberrations of the lens-eye system. In one embodiment, indocyan dye is employed, but it will be appreciated that other dyes, powders, or other types of infrared or ultraviolet responsive products may be employed.

One prescribing and fitting method of the present invention may include the steps of: selecting an initial fitting lens 90 to conform to the shape of the underlying cornea; capturing an image of circumferential mark 96, radial mark 98, and the pupil margin; measuring the residual low and higher order aberrations of the lens-eye system; performing analysis utilizing the known ocular surface profile of fitting lens 90, the initial lens thickness profile, the registration error, and the residual lens-eye aberration error to determine the resultant files for generating a final corrective prescription contact lens.

Another method of the present invention comprises correcting accommodative lag by providing a multi-focal lens in conjunction with the desired aberration structure for the reduction of myopia. The method uses a set of fitting lenses having a known ocular surface profile and thickness profile and containing one or more circumferential mark(s) and/or radial mark(s) for the purpose of registration of the final optical correction with the coordinates of the optical system of the eye. The method steps may include: selecting the initial fitting lens to conform to the shape of the underlying cornea; capturing an image of the circumferential mark and radial mark and the pupil margin; measuring the size of the pupil in photopic, mesopic and/or scotopic illumination; measuring the residual low and higher order aberrations of the lens-eye system; and performing analysis utilizing the known ocular surface profile, the initial lens thickness profile, the registration error, the pupil size and the residual lens-eye aberration error to determine prescription information for generating a final contact lens. In one embodiment of this method, the diameter of the near focused optical correction may be in the range of about 1.5 mm to about 4.0 mm.

Another method of the present invention comprises correcting accommodative lag by providing a multi-focal lens in conjunction with the desired aberration structure for the reduction of myopia. The method uses a set of multi-focal fitting lenses having a known ocular surface profile and thickness profile and containing circumferential marks, radial marks or other types of marks as described above, for the purpose of registration of the final optical correction with the coordinates of the optical system of the eye. The method steps may include: selecting the initial lens to conform to the shape of the underlying cornea having a multi-focal anterior surface; capturing an image of the circumferential and radial marks and the pupil margin; measuring the size of the pupil in photopic, mesopic and/or scotopic illumination; measuring the residual low and higher order aberrations of the lens-eye system; and performing analysis utilizing the known ocular surface profile, the initial lens thickness profile, the registration error, the pupil size and the residual lens-eye aberration error to determine prescription information for generating a final multi-focal contact lens. In one embodiment of this method, the diameter of the near focused optical correction may be in the range of about 1.5 mm to about 4.0 mm.

The above-described methods of prescribing and/or fitting contact lenses may also employ additional method steps or additional devices. For example: the method of determining the difference in the coordinates of the center of the circumferential marks and the pupil margin may incorporate a reticle of a biomicroscope or a camera with subsequent manual or electronic digital image detection. In addition, the method of measuring the residual aberrations of the lens-eye system may incorporate Shack-Hartmann aberrometry, aberrometers utilizing Tscherning technology, laser ray-tracing or Talbot interferometry technology.

A method for determining a preferred aberration prescription for a patient's eye will now be described. Initially, set of precision diagnostic lenses is selected wherein each lens has a measured ocular surface profile, a measured thickness profile and low and higher order aberrations known as the aberration fingerprint of the lens, a registration mark including a circumferential mark concentric and an intersecting radial mark, is applied on the patient's eye and allowed to equilibrate. The fitting lens is chosen that approximates the sagittal depth of the eye over the chord diameter of the rigid portion and overall diameter. The degree of rotational and translational movement should be less than 5 degrees rotational and 0.3 mm translational.

After the lens has equilibrated, the residual aberrations of the lens-eye system are measured. The residual lens-eye aberrations are measured through the fitting lens, along with the relative coordinates of the lens marks and the pupil margin, limbal margin and/or other anatomical features. The method further comprises the step of choosing a predetermined aberration pattern for the lens-eye system. The predetermined aberration pattern preferably is selected to induce a positive spherical aberration in the lens-eye system. The ocular surface profile of the lens, the thickness profile of the lens, the aberration fingerprint of the lens, the registration error and the residual low and higher order aberrations of the lens-eye system and the predetermined aberration pattern for the final lens-eye system are used to determine the preferred aberration prescription for the patient's eye.

Alternative embodiments of the present invention for prescribing and fitting contact lenses may involve the use of: (1) infrared-responsive marks; (2) a set of precision rotating and non rotating hybrid contact lenses having known ocular surface profiles, optical corrections and thickness profiles; (3) a set of contact lenses having a known central zone ocular surface geometry, thickness, anterior surface geometry and diameter; or (4) a set of contact lenses with fixed ocular surface geometries, overall diameters and front surface geometries. Such embodiments for prescribing and fitting contact lenses are described hereinabove in further detail.

The preferred aberration prescription for the patient's eye is used to create a cutting tile for machining the contact lens, spectacle lens or intraocular lens to induce the selected higher-order aberrations in the lens-eye system. Alternatively, the preferred aberration prescription may be used to create the predetermined aberration pattern in the anatomy of the patient's eye by reshaping the patient's cornea to modify the resultant optical path. Low order aberrations in the eye or lens-eye system preferably are reduced to a subclinical level (below 0.10 micron over 6 mm). The registration principles employed to create the higher-order aberrations are substantially the same as those employed to create corrections for measured aberrations. The primary aberration structure comprises a positive spherical aberration of a predetermined amount that is modulated for control of refractive error development. A preferred amount of positive spherical aberration is an amount of spherical aberration over a diameter of pupil that neither stimulates axial length growth nor impedes axial length growth.

According to the principles of the present invention, the creation of positive spherical aberration is preferred over the substantial correction of the eye's spherical aberration (i.e., creating a spherical aberration of approximately zero). Moreover, the creation of positive spherical aberration is preferred over the creation of negative spherical aberration in the patient's eye. Positive spherical aberration is defined as a spherical aberration of greater than 0 micron per 6 mm. An average amount of positive spherical aberration in an emmetropic human eye is about 0.1 micron per 6 mm. According to the present invention, a preferred amount of positive spherical aberration for the reduction or prevention of myopia is greater than zero micron per 6 mm, but less than about 0.3 micron per 6 mm, most preferably from about 0.05 micron per 6 mm to about 0.2 micron per 6 mm.

Figure 13:
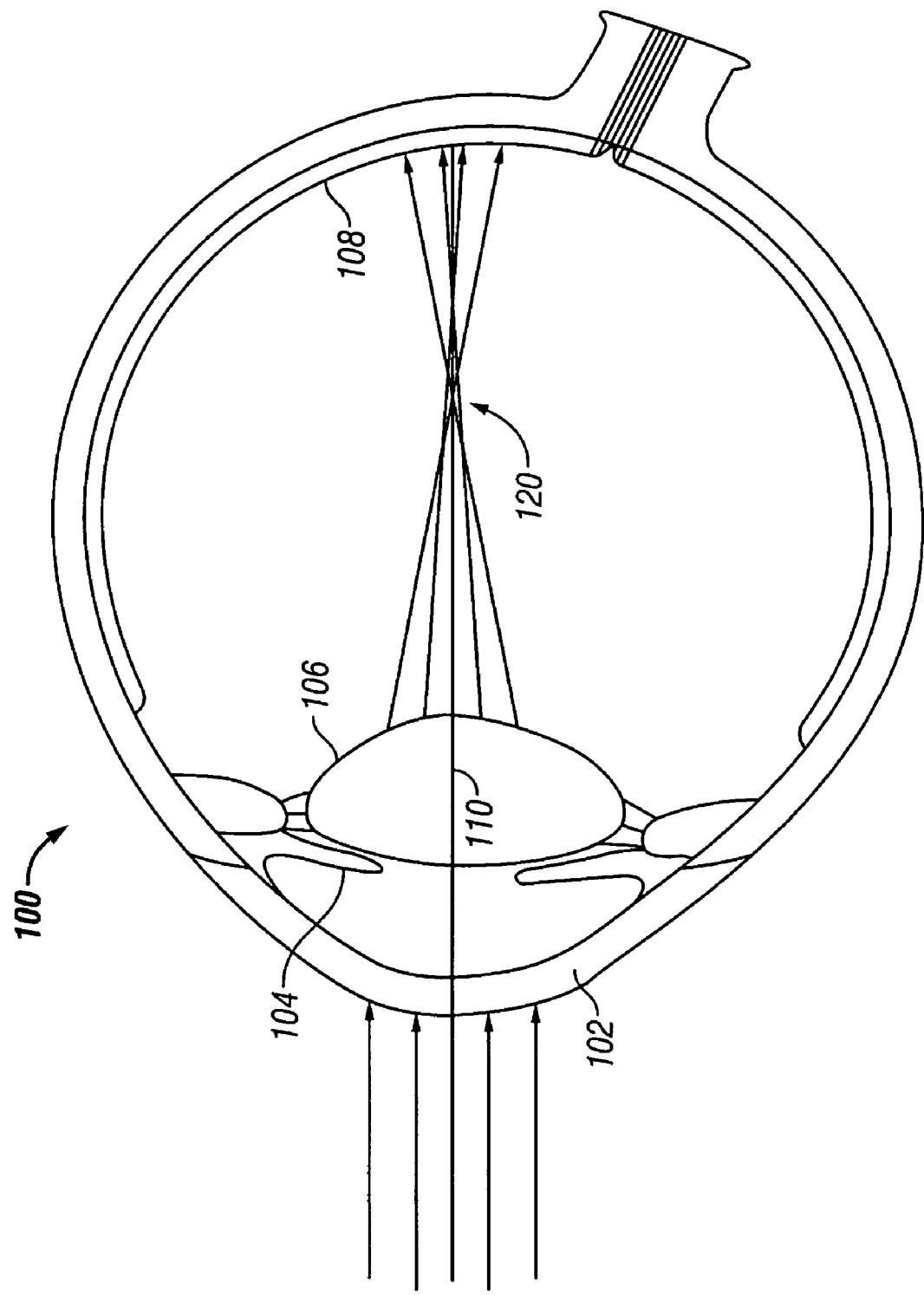
FIG. 13 is a cross-sectional view of a human eye having a positive spherical aberration that causes a wavefront error in which the paracentral wavefront is disposed in front of the retina.

FIG. 13 is a cross-sectional view of a human eye 100 comprising cornea 102, iris 104, lens 106, retina 108 and optic axis 110. The creation of a positive spherical aberration in the eye 100 causes a wavefront error in which the paracentral wavefront 120 is disposed in front of the retina 108. In other words, when a central portion of a reference wavefront passes through the retina 108, paracentral wavefront 120 is disposed in front of the retina 108. The displacement of paracentral wavefront 120 produces a signal that counters axial length growth in the eye 100, which reflects the body's effort to move the retina 108 into the plane of focus. Advantageously, countering axial growth in the eye 100 is a preventive measure to reduce or eliminate the progression of myopia According to the principles of the present invention, the treatment for myopia prevention may comprise the creation of a positive spherical aberration in the eye, in conjunction with one or more of the following therapies, including: (1) elimination or reduction in sustained close work; (2) increased illumination during work and other activities; (3) increased working distance; (4) vision therapy; and (5) prescription lenses and prisms to eliminate need for accommodative lag in esophoric patients.

Figure 14:
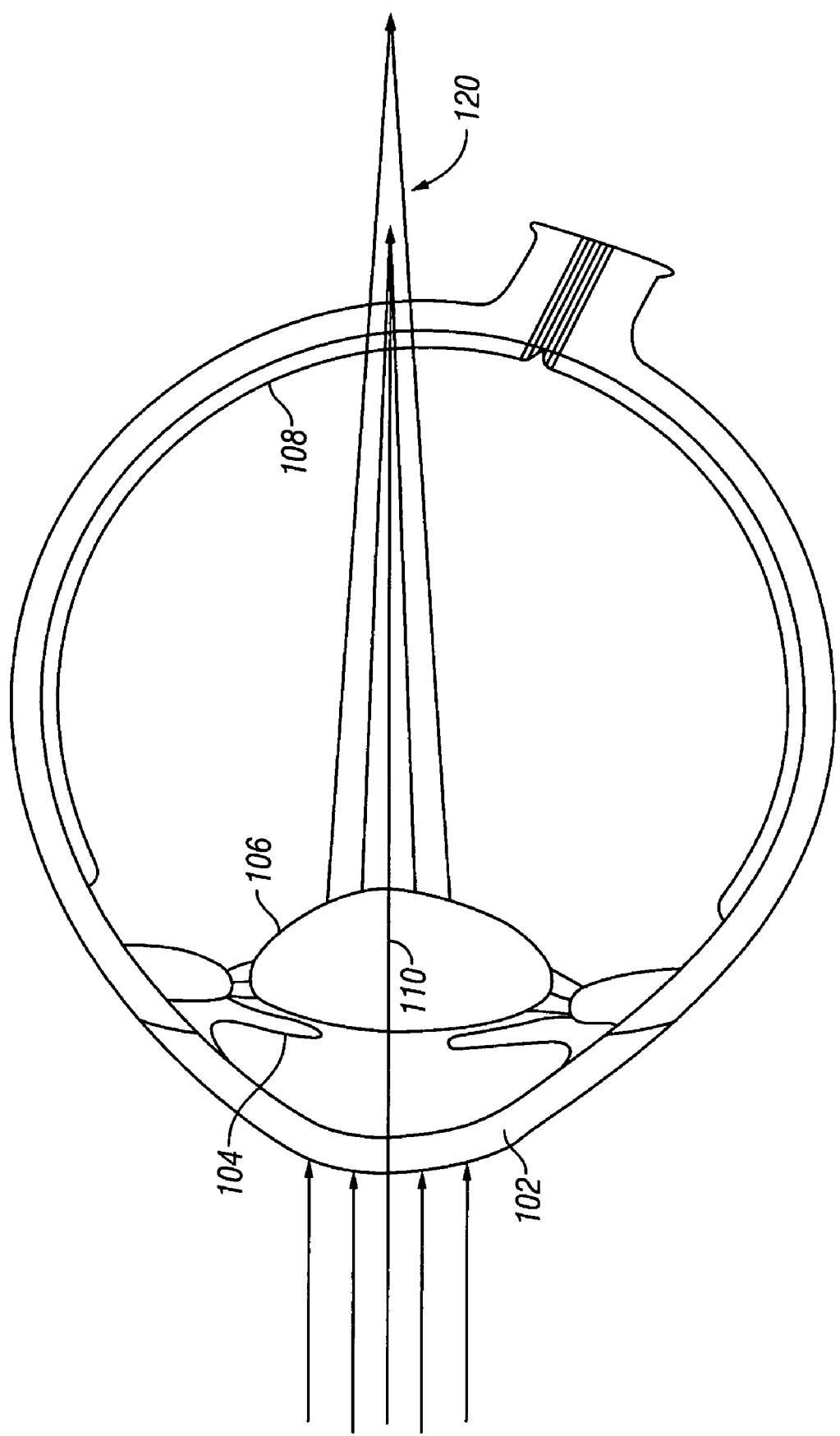
FIG. 14 is a cross-sectional view of a human eye having a negative spherical aberration that causes a wavefront error in which the paracentral wavefront is disposed behind the retina.

FIG. 14 is a cross-sectional view of the human eye 100 of FIG. 12, wherein a negative spherical aberration has been induced such that the paracentral wavefront 120 is disposed behind the retina 108. In other words, when a central portion of a reference wavefront passes through the retina 108, paracentral wavefront 120 is disposed behind the retina 108. The negative spherical aberration produces a signal that stimulates axial length growth in the body's effort to move the retina 108 into the plane of focus. Axial length growth results in myopia, wherein the focal power of the eye is too great for the length of the eye.

As set forth hereinabove, there exists a correlation between hysteresis of the cornea and myopia. Specifically, when an eye focuses on a close image, the ciliary muscle exerts a force on the sclera and cornea. In the case of greater hysteresis, this force causes an increase in corneal eccentricity. The increase in corneal eccentricity decreases spherical aberration, which produces a signal that stimulates axial length growth. There exists a correlation between accommodative lag and myopia. Specifically, the accommodative lag causes the entire wavefront to be disposed behind the retina, which produces a signal that stimulates axial length growth in the body's effort to move the retina into the plane of focus. Increased axial length growth results in increased myopia.

In accordance with the principles of the present invention, methods of screening a patient to determine the patient's probability of becoming myopic or highly myopic will now be described. According to a first embodiment, aberrometry is performed on a patient's eye to determine the amount of existing spherical aberration. Factors that tend to increase the patient's chances of becoming myopic include low spherical aberration, no spherical aberration or negative spherical aberration. Factors that tend to increase the patient's chances of becoming highly myopic include low spherical aberration, no spherical aberration or negative spherical aberration, in combination with myopia. Other factors that may be screened for, in addition to spherical aberration, include, but are not limited to: (1) accommodative lag; (2) hysteresis; (3) genetics; (4) nutrition; (5) working environment; (6) stress; and (7) esophoria at near or high accommodative convergence to accommodation ratio. Screening for spherical aberration preferably is performed in combination with screening for one or more of these factors to determine a more accurate probability of the patient's eye becoming highly myopic.

According to another embodiment of the invention, hysteresis of a patient's eye is determined by measurement with instruments such as the non-contact tonometer. A high amount of hysteresis in the patient's eye indicates that the eye is likely to become highly myopic, whereas a low amount of hysteresis in the patient's eye indicates that the eye is not likely to become highly myopic. In this manner, measuring the hysteresis the eye is used to determine the probability of the eye becoming highly myopic. If hysteresis is present, a hybrid fitting lens is preferred. Screening for hysteresis may be done in combination with screening for spherical aberration and other factors (e.g., accommodative lag, genetics, nutrition, working environment, stress, ocular motor processing) to determine a more accurate probability of the patient's eye becoming highly myopic.

According to a further embodiment of the invention, a patient's eye is screened for the presence of accommodative lag in a manner known to those of ordinary skill in the art. If accommodative lag is present, a multi-focal hybrid fitting lens is preferred. A high amount of accommodative lag in the patient's eye is an additional factor that indicates the eye is likely to become highly myopic, whereas a lack of accommodative lag in the patient's eye is a factor that indicates the eye is not likely to become highly myopic. In this manner, measuring the accommodative lag of the eye is used to determine the probability of the eye becoming highly myopic. Screening for accommodative lag may be done in combination with screening for spherical aberration, hysteresis and other factors (e.g., genetics, nutrition, working environment, stress, ocular motor processing) to determine a more accurate probability of the patient's eye becoming highly myopic.

The hybrid lens described hereinabove is part of the preferred lens-eye system of the present invention. Advantageously, the hybrid lens features rigid optics and the ability to center the aberration structure over a pupil. Changes in anterior corneal geometry during accommodation have no effect on the lens-eye aberration structure due to the rigid optics. However, when a soft or spectacle lens is employed, the paracentral wavefront is dynamic due to hysteresis. This is the case even if a preferred spherical aberration was used to send the correct signal. Therefore, myopia control may be compromised. By contrast, the paracentral wavefront remains substantially constant over time when using the hybrid lens of the present invention. Alternatively, any other lens may be employed in the lens-eye system, including: (1) spectacle lenses; (2) multi-focal lenses; (3) intraocular lenses; (4) intracorneal rings and lenses, (5) hard contact lenses; and (6) soft contact lenses. According to further embodiments of the invention, corneal reshaping procedures may be employed to produce an optical path that provides a retinal focus to produce a desired aberration pattern.

Figure 15:
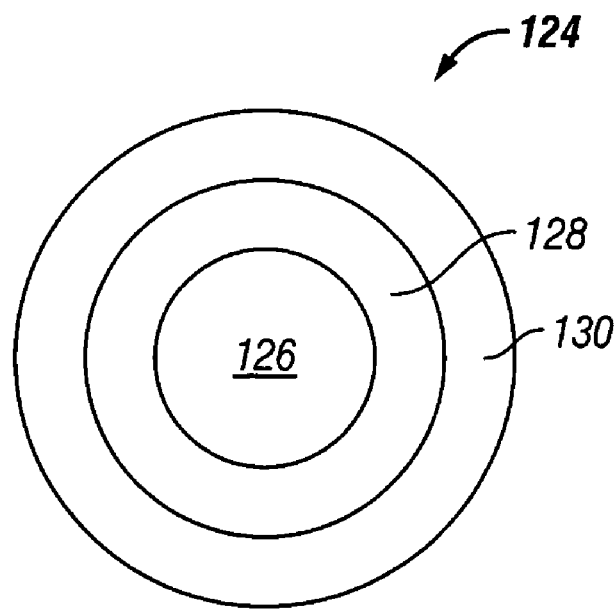
FIG. 15 is a front view of a multi-focal lens for myopia prevention comprising a central reading zone, an intermediate distance zone and a peripheral spherical aberration zone.
Figure 16:
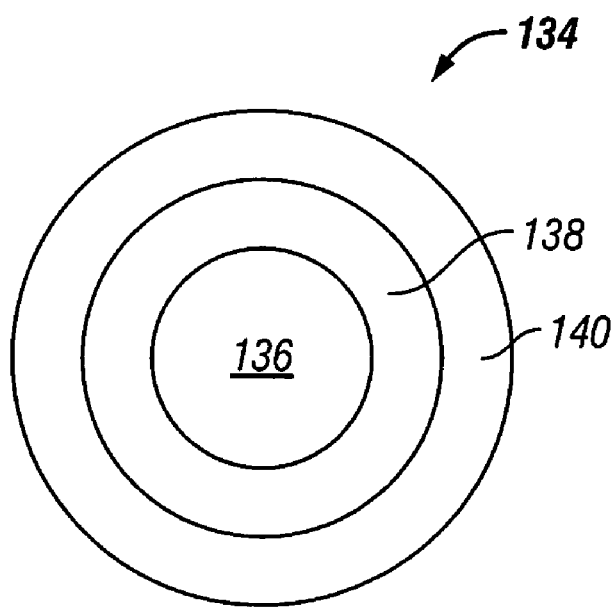
FIG. 16 is a front view of an alternative multi-focal lens for myopia prevention comprising a central distance zone, an intermediate reading zone and a peripheral spherical aberration zone.

Referring to FIG. 15, a multi-focal lens 124 for myopia prevention comprises central reading zone 126, intermediate distance zone 128 and peripheral spherical aberration zone 130. Spherical aberration zone 130 of lens 124 preferably has been machined to induce selected higher-order aberrations in a lens-eye system including the patient's eye. The multi-focal lens 124 may be a soft or hard contact lens, or a spectacle lens. Referring to FIG. 15, an alternative multi-focal lens 134 for myopia prevention comprises central distance zone 136, intermediate reading zone 138 and peripheral spherical aberration zone 140. Similar to the embodiment of FIG. 14, spherical aberration zone 140 of lens 134 preferably has been machined to induce selected higher-order aberrations in a lens-eye system including the patient's eye. Multi-focal lenses 124, 134 may be used in conjunction with one or more of the following therapies, including: (1) elimination or reduction in sustained close work; (2) increased illumination during work and other activities; (3) increased working distance; (4) vision therapy; and (5) prescription lenses and prisms to eliminate need for accommodative lag in esophoric patients.

In accordance with an additional aspect of the invention, the optical path of contact lenses may be altered by modifying the thickness profile of the lenses and/or the index of refraction of the lenses over the optical zone, for the purpose of creating the desired higher-order aberration structure. By modifying the thickness profile and/or index of refraction of the contact lenses, the resultant optical path of the contact lenses may be corrected to reduce or prevent the progression of myopia. In accordance with yet another aspect of the invention, the optical path of spectacle lenses, multi-focal or intraocular lenses may be altered by modifying the thickness profile of the lenses and/or the index of refraction of the lenses over the optical zone, for the purpose of correcting higher-order aberrations. By modifying the thickness profile and/or index of refraction of the lenses, the resultant optical path may be corrected to reduce or prevent the progression of myopia.

In accordance with a further aspect of the invention, one or more corneal reshaping procedures may be employed to produce an optical path that provides a retinal focus to correct all low order aberrations in the eye and the desired higher order aberration structure to control the progression of myopia. Such corneal reshaping procedures include, but are not limited to: (1) photorefractive keratectomy; (2) laser assisted in situ keratomelusis; (3) conductive keratoplasty; (4) intracorneal lenses; (5) intracorneal rings; (6) corneal refractive therapy; and (7) orthokeratology. These corneal reshaping procedures may be guided by wavefront sensing for the purpose of correcting higher-order aberrations. By modifying the thickness profile and/or index of refraction of the cornea, the resultant optical path of the cornea may be corrected to reduce or prevent the progression of myopia.

Thus, it is seen that methods and apparatus for reducing or eliminating the progression of myopia are provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. It is noted that various equivalents for the particular embodiments discussed in this description may practice the invention as well.

What is claimed is:

1. Apparatus for reducing or eliminating the progression of myopia in a myopic eye, comprising:
   a lens having an aberration pattern for reducing the progression of myopia in the eye, wherein the aberration pattern comprises a positive spherical aberration,
   wherein the positive spherical aberration causes a wavefront error in which the paracentral wavefront is disposed in front of the retina of the eye, and the wavefront error produces a signal that counters axial length growth in the eye, thereby reducing the progression of myopia.

2. The apparatus of claim 1, wherein the positive spherical aberration is modulated for control of refractive error development.

3. The apparatus of claim 1, wherein the lens is a hybrid contact lens having a substantially rigid central portion and a substantially flexible peripheral portion.

4. The apparatus of claim 1, wherein the lens is a multi-focal lens comprising a reading zone, a distance zone and a spherical aberration zone.

5. The apparatus of claim 1, wherein the lens is a spectacle lens.

6. The apparatus of claim 1, wherein the lens is an intraocular lens.

7. The apparatus of claim 1, wherein the lens is a hard contact lens or a soft contact lens.

8. The apparatus of claim 1, wherein the aberration pattern is created by modifying the thickness profile of the lens.

9. The apparatus of claim 1, wherein the aberration pattern is created by modifying the index of refraction of the lens over the optical zone.

10. Apparatus for reducing or eliminating the progression of myopia in a myopic eye, comprising:
    a lens having an aberration pattern for reducing the progression of myopia in the eye, wherein the aberration pattern comprises a positive spherical aberration,
    wherein the lens is a hybrid contact lens having a substantially rigid central portion and a substantially flexible peripheral portion,
    wherein the hybrid contact lens includes substantially rigid optics and permits the centering of an aberration structure over the pupil of the eye, and the rigid optics maintain a substantially constant aberration structure during use of the contact lens.

11. A method of creating a lens for a lens-eye system including a myopic eye, the method comprising the steps of: measuring the residual aberrations in the eye using a diagnostic lens; and inducing an aberration pattern in the lens-eye system, thereby reducing the progression of myopia in the eye,
    wherein the lens is a hybrid contact lens having a substantially rigid central portion and a substantially flexible peripheral portion,
    wherein the hybrid contact lens includes substantially rigid optics and permits the centering of an aberration structure over the pupil of the eye, and the rigid optics maintain a substantially constant aberration structure during use of the contact lens.

12. The method of claim 11, wherein the aberration pattern comprises a positive spherical aberration.

13. The method of claim 11, further comprising the step of reducing low order aberrations in the lens-eye system to a subclinical level.

14. The method of claim 11, wherein the lens is a multi-focal lens comprising a reading zone, a distance zone and a spherical aberration zone.

* * * * *